(12) United States Patent
Nami et al.

(10) Patent No.: US 9,716,425 B2
(45) Date of Patent: Jul. 25, 2017

(54) MULTILEVEL CONVERTER WITH HYBRID FULL-BRIDGE CELLS

(71) Applicant: ABB TECHNOLOGY LTD, Zürich (CH)

(72) Inventors: Alireza Nami, Västerås (SE); Liwei Wang, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/653,721

(22) PCT Filed: Jan. 21, 2013

(86) PCT No.: PCT/EP2013/051027
§ 371 (c)(1),
(2) Date: Jun. 18, 2015

(87) PCT Pub. No.: WO2014/111164
PCT Pub. Date: Jul. 24, 2014

(65) Prior Publication Data
US 2015/0357905 A1    Dec. 10, 2015

(51) Int. Cl.
*H02M 7/483*    (2007.01)
*H02M 1/32*    (2007.01)
(Continued)

(52) U.S. Cl.
CPC .............. *H02M 1/32* (2013.01); *H02M 7/06* (2013.01); *H02M 7/219* (2013.01); *H02M 7/483* (2013.01);
(Continued)

(58) Field of Classification Search
CPC ............ H02J 3/36; H02M 7/797; H02M 7/68; H02M 7/70; H02M 7/72; H02M 7/06;
(Continued)

(56) References Cited

U.S. PATENT DOCUMENTS 8,213,198 B2    7/2012    Abolhassani et al.
2011/0163702 A1*   7/2011   Dommaschk .............. H02P 3/22
                                                318/376
(Continued)

FOREIGN PATENT DOCUMENTS

CN    101882877 A    11/2010
DE   WO 2011067120 A1 *   6/2011   .............. H02M 7/49
(Continued)

OTHER PUBLICATIONS

Ebrahimi et al., "A New Multilevel Converter Topology With Reduced Number of Power Electronic Components", IEEE Transactions on Industrial Electronics, vol. 59, No. 2, Feb. 2012, pp. 655-667.
(Continued)

*Primary Examiner* — Gary L Laxton
*Assistant Examiner* — Ivan Laboy Andino
(74) *Attorney, Agent, or Firm* — Birch, Stewart, Kolasch & Birch, LLP

(57) ABSTRACT

A multilevel converter converting between AC and DC includes a phase arm with a number of cells between a DC pole and an AC terminal, the cells include at least one hybrid full bridge cell including a first cell connection terminal for coupling to the DC pole, a second cell connection terminal for coupling to the AC terminal, an energy storage element having a positive and a negative end, a first group of series connected semiconducting units in parallel with the energy storage element, where a junction between these forms one cell connection terminal, and a second group of series connected semiconducting units in parallel with the energy storage element and including a third semiconducting unit and a fourth semiconducting unit consisting of a number of unidirectional conducting elements including at least one
(Continued)

unidirectional conducting element, where a junction between these forms a further cell connection terminal.

19 Claims, 7 Drawing Sheets

(51) Int. Cl.
- *H02M 7/219* (2006.01)
- *H02M 7/06* (2006.01)
- *H02M 7/797* (2006.01)
- *H02M 7/5388* (2007.01)

(52) U.S. Cl.
CPC .......... *H02M 7/797* (2013.01); *H02M 7/5388* (2013.01); *H02M 2007/4835* (2013.01)

(58) Field of Classification Search
CPC .......... H02M 7/219; H02M 7/42; H02M 7/44; H02M 7/48; H02M 7/483; H02M 7/49; H02M 7/5387; H02M 7/5388; H02M 1/32; H02M 2001/325; H02M 2007/4835; H02M 7/08; H02M 7/12; H02M 7/487; H02M 7/537; H02M 2001/322
USPC ............ 363/16–17, 35, 37–43, 50–55, 363/56.01–56.05, 95–98, 123, 125, 363/131–132, 135–136
See application file for complete search history.

(56) References Cited

U.S. PATENT DOCUMENTS

| | | | | |
|---|---|---|---|---|
| 2012/0127766 A1* | 5/2012 | Crookes | ............... | H02J 3/1857 363/126 |
| 2012/0195084 A1* | 8/2012 | Norrga | ................. | H02M 7/483 363/127 |
| 2012/0243282 A1* | 9/2012 | Marquardt | .............. | H02M 7/49 363/132 |
| 2013/0148392 A1* | 6/2013 | Inoue | ...................... | H02M 7/10 363/68 |
| 2013/0308235 A1* | 11/2013 | Davies | ................. | H02H 7/1257 361/62 |
| 2014/0268888 A1* | 9/2014 | Lv | ......................... | H02M 1/088 363/10 |

FOREIGN PATENT DOCUMENTS

| | | |
|---|---|---|
| EP | 2 244 368 A1 | 10/2010 |
| WO | WO 2010/149200 A1 | 12/2010 |
| WO | WO 2011/012174 A1 | 2/2011 |
| WO | WO 2011/042050 A1 | 4/2011 |
| WO | WO 2011/124258 A1 | 10/2011 |
| WO | WO 2011/124260 A1 | 10/2011 |
| WO | WO 2012/116738 A1 | 9/2012 |
| WO | WO 2012/140008 A2 | 10/2012 |

OTHER PUBLICATIONS

Kouro et al., "Recent Advances and Industrial Applications of Multilevel Converters", IEEE Transactions on Industrial Electronics, vol. 57, No. 8, Aug. 2010, pp. 2553-2580.

Lesnicar et al., "A new modular voltage source inverter topology", EPE 2003, 10 pages.

Marquardt et al., "New Concept for High Voltage—Modular Multilevel Converter", PESC 2004 Conference in Aachen, Germany, IEEE 2004, 5 pages.

* cited by examiner

MULTILEVEL CONVERTER WITH HYBRID FULL-BRIDGE CELLS

FIELD OF INVENTION

The present invention generally relates to multilevel converters. More particularly the present invention relates to a multilevel converter configured to convert between alternating current and direct current.

BACKGROUND

Multilevel converters are of interest to use in a number of different power transmission environments. They may for instance be used as voltage source converters in direct current power transmission systems such as high voltage direct current (HVDC) and alternating current power transmission systems, such as flexible alternating current transmission system (FACTS). They may also be used as reactive compensation circuits such as Static VAR compensators.

In order to reduce harmonic distortion in the output of power electronic converters, where the output voltages can assume several discrete levels, so called multilevel converters have been proposed. In particular, converters where a number of cascaded converter cells, each comprising a number of switching units and an energy storage unit in the form of a DC capacitor have been proposed.

Examples of such converters can be found in Marquardt, 'New Concept for high voltage-Modular multilevel converter', IEEE 2004, A. Lesnicar, R. Marquardt, "A new modular voltage source inverter topology", EPE 2003, WO 2010/149200 and WO 2011/124260.

Converter elements in such a converter may for instance be of the half-bridge, full-bridge or clamped double cell type.

A half-bridge connection in upper and lower arms provides unipolar cell voltage contributions and offers the simplest structure of the chain link converter. This type is described by Marquardt, 'New Concept for high voltage-Modular multilevel converter', IEEE 2004 and A. Lesnicar, R. Marquardt, "A new modular voltage source inverter topology", EPE 2003.

However, there is a problem with the half-bridge topology in that the fault current blocking ability in the case of a DC fault, such as a DC pole-to-pole or a DC pole-to-ground fault, is limited.

One way to address this is through the use of full-bridge cells. This is described in WO 2011/012174. Series connection of full-bridge cells offers four quadrant power flows through the energy storage element of the cell capacitor as well as DC fault voltage blocking capability by imposing a reverse voltage. However, the use of full-bridge cells doubles the number of components compared with a half-bridge cell.

One way to reduce the number of components combined with a retained fault current limiting ability is through mixing the cells of the half- and full-bridge type. Half of the cells may then be full-bridge cells used for imposing the reverse voltage due to the rating of the cascaded converter cells. This is for instance described in WO 2011/042050. The mixing of cells reduces the number of components further while retaining a good fault current limitation ability.

However there is still room for improvement with regard to component reduction combined with fault current limitation.

SUMMARY OF THE INVENTION

The present invention is directed towards reducing the number of components in a voltage source converter combined with providing sufficient fault current limitation.

This object is according to a first aspect achieved through a multilevel converter configured to convert between alternating current and direct current and comprising at least one phase arm with a number of cells between a DC pole and an AC terminal, the cells comprising at least one hybrid full-bridge cell for fault current handling operation, said hybrid full-bridge cell comprising a first cell connection terminal for coupling to the DC pole, a second cell connection terminal for coupling to the AC terminal, an energy storage element having a positive and a negative end, a first group of series connected semiconducting units, which group is connected in parallel with the energy storage element and where the semiconducting units of the first group comprises first and second switching elements with first and second anti-parallel unidirectional conducting elements, where a junction between the first and second semiconducting unit forms one cell connection terminal, a second group of series connected semiconducting units, which group is connected in parallel with the energy storage element as well as with the first group and where the semiconducting units of the second group comprises a third semiconducting unit having a third switching element with anti-parallel unidirectional conducting element and a fourth semiconducting unit consisting of at least one unidirectional conducting element, where a junction between the first and second semiconducting unit forms a further cell connection terminal.

The present invention has a number of advantages. It provides equal fault limiting capability as similar conventional converter structures with a reduced number of components. This is combined with a modular cell structure with low complexity and low costs. Another advantage is that the number of control signals needed for controlling the cell are reduced.

BRIEF DESCRIPTION OF THE DRAWINGS

The present invention will in the following be described with reference being made to the accompanying drawings, where FIG. 1 schematically shows a cell-based voltage source converter connected between two poles, FIG. 2 schematically shows the structure of a first type of hybrid full-bridge cell, FIG. 3 schematically shows the structure of a first type of half-bridge cell, FIG. 4 schematically shows the structure of a second type of hybrid full-bridge cell, FIG. 5 schematically shows the structure of a second type of half-bridge cell, FIG. 6 schematically shows a first realization of a voltage source converter phase leg employing hybrid full-bridge cells of the first and second type and half-bridge cells of the first and second type, FIG. 7 schematically shows a fault current path through an upper phase arm of the converter of FIG. 6 in case of a first pole-to-ground fault occurring with a positive AC voltage, FIG. 8 schematically shows a fault current path through the upper phase arm of the converter of FIG. 6 in case of the first pole-to-ground fault occurring with a negative AC voltage, FIG. 9 schematically shows a fault current path through a lower phase arm of the converter of FIG. 6 in case of a second pole-to-ground fault occurring with a negative AC voltage, FIG. 10 schematically shows a fault current path through the lower phase arm of the converter of FIG. 6 in case of the second pole-to-ground fault occurring with a positive AC voltage, FIG. 11 schematically shows the structure of a third type of hybrid full-bridge cell, and FIG. 12 schematically shows the structure of a fourth type of hybrid full-bridge cell.

DETAILED DESCRIPTION OF THE INVENTION

In the following, a detailed description of preferred embodiments of the invention will be given.

Figure 1:
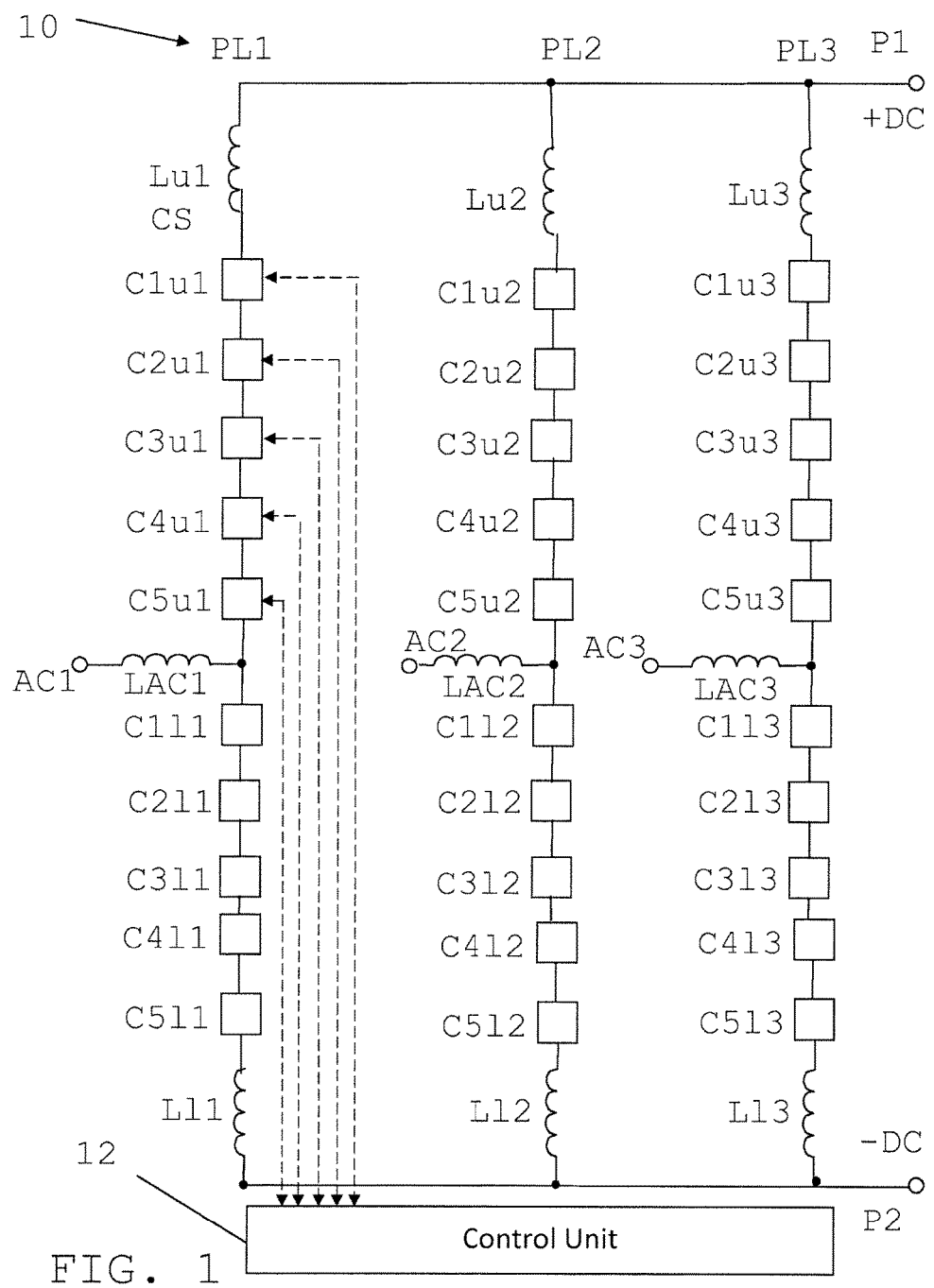

FIG. 1 shows one variation of a multilevel converter in the form of a cell based voltage source converter 10. The converter operates to convert between alternating current (AC) and direct current (DC). The converter 10 in FIG. 1 comprises a three-phase bridge made up of a number of phase legs. There are in this case three phase legs. It should however be realized that as an alternative there may be for instance only two phase legs. There is thus a first phase leg PL1, a second phase leg PL2 and a third phase leg PL3. The phase legs are more particularly connected between two DC poles, a first DC pole P1 and a second DC pole P2 and the mid points of the phase legs are connected to corresponding alternating current terminals AC1, AC2, AC3. The midpoint of a phase leg is here connected to a corresponding AC terminal via a reactor LAC1, LAC2 and LAC3. A phase leg is thereby divided into two halves, an upper half and a lower half, where such a half is also termed a phase arm.

The first DC pole P1 furthermore has a first potential +DC that may be positive, while the second DC pole has a second potential −DC that may be negative. The first pole P1 may therefore also be termed a positive pole, while the second pole P2 may be termed negative pole.

These poles may furthermore be part of a DC power transmission system such as a High Voltage Direct Current (HVDC) power transmission system or a flexible alternating current transmission system (FACTS).

As mentioned above, the voltage source converter of FIG. 1 is only one example of a multilevel converter where the invention may be used. It is for instance possible to provide the three phase legs in series with each other between the two poles, where these then make up a first set of phase legs. It is then possible to provide a second set of series-connected phase legs in parallel with the first set. In this case the midpoints of the phase legs of the first set forms primary AC terminals and the midpoints of the phase legs of the second set forms secondary AC terminals for the three phases.

Yet another realization of a multilevel converter is a static VAR compensator.

The phase arms of the voltage source converter 10 in the example in FIG. 1 comprise cells. A cell is a unit that may be switched for providing a voltage contribution to the voltage on the corresponding AC terminal. A cell then comprises one or more energy storage elements, for instance in the form of capacitors, and the cell may be switched to provide a voltage contribution corresponding to the voltage of the energy storage element or a zero voltage contribution. If more than one energy storage element is included in a cell it is possible with even further voltage contributions.

The cells are with advantage connected in series or in cascade in a phase arm.

In the example given in FIG. 1 there are five series-connected or cascaded cells in each phase arm. Thus the upper phase arm of the first phase leg PL1 includes five cells $C1u1$, $C2u1$, $C3u1$, $C4u1$ and $C5u1$, while the lower phase arm of the first phase leg PL1 includes five cells C111, C211, C311, C411 and C511. In a similar fashion the upper phase arm of the second phase leg PL2 includes five cells $C1u2$, $C2u2$, $C3u2$, $C4u2$ and $C5u2$ while the lower phase arm of the second phase leg PL2 includes five cells C112, C212, C312, C412 and C512. Finally the upper phase arm of the third phase leg PL3 includes five cells $C1u3$, $C2u3$, $C3u3$, $C4u3$ and $C5u3$ while the lower phase arm of the third phase leg PL3 includes five cells C113, C213, C313, C413 and C513. The number of cells provided in FIG. 1 is only an example. It therefore has to be stressed that the number of cells in a phase arm may vary. It is often favorable to have many more cells in each phase arm, especially in HVDC applications. A phase arm may for instance comprise hundreds of cells. There may however also be fewer.

Control of each cell in a phase arm is normally done through providing the cell with a control signal directed towards controlling the contribution of that cell to meeting a reference voltage. The reference voltage may be provided for obtaining a waveform on the AC terminal of a phase leg, for instance a sine wave.

In order to control the cells there is therefore a control unit 12.

The control unit 12 is provided for controlling all the phase arms of the converter. However, in order to simplify the figure only the control of the upper phase arm of the first phase leg PL is indicated in FIG. 1.

The other phase arms are controlled in a similar manner in order to form output waveforms on the three AC terminals AC1, AC2 and AC3.

There are a number of different cell types that can be used in the converter, such as full-bridge cells, half-bridge cells and clamped double cells.

The invention is based on the use of hybrid full-bridge cells. A hybrid full-bridge cell is in the context discussed here defined as a full-bridge cell where one bridge unit comprising at least one switching element anti-parallel unidirectional conducting element pair is replaced by at least one unidirectional conducting element. A hybrid full-bridge cell in the definition used here is in one specific example thus a full-bridge where one of the switches is replaced by a diode. Thereby the cell can furthermore be termed an asymmetric full-bridge cell or an asymmetric hybrid full-bridge cell.

Figure 2:
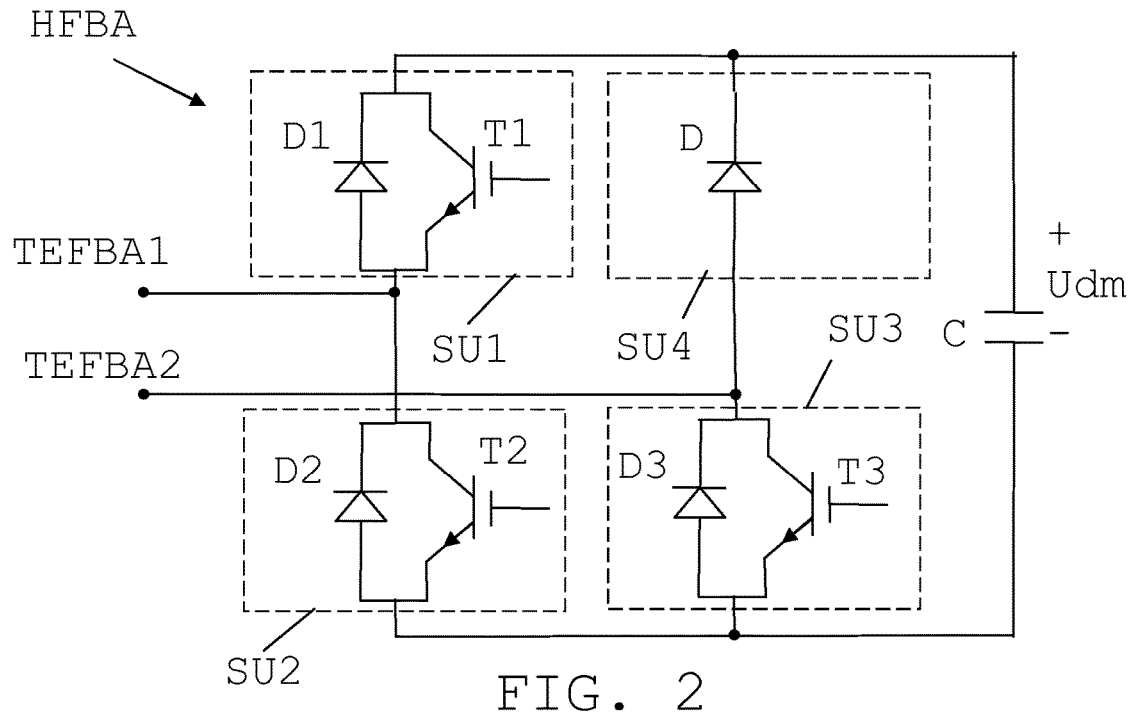

FIG. 2 shows a first type of hybrid full-bridge cell HFBA that is to be provided in the upper phase arm of the first phase leg.

The cell HFBA is thus a hybrid full-bridge converter cell and includes an energy storage element, here in the form of a capacitor C, which is connected in parallel with a first group of semiconducting units SU1 and SU2. The energy storage element provides a voltage Udm, and therefore has a positive and negative end, where the positive end has a higher potential than the negative end. The semiconducting units SU1 and SU2 in the first group are connected in series with each other. The first group here includes two semiconducting units SU1 and SU2 (shown as dashed boxes). These two semiconducting units SU1 and SU2 are here provided as two series-connected switches S1 and S2, where each switch may be realized in the form of a switching element that may be an IGBT (Insulated Gate Bipolar Transistor) transistor together with an anti-parallel unidirectional conducting element. In FIG. 2 the first semiconducting unit SU1 is therefore provided as a first switch S1 having a first transistor T1 with a first anti-parallel diode D1. The first diode D1 is connected between the emitter and collector of the transistor T1 and has a direction of conductivity from the emitter to the collector as well as towards the positive end of the energy storage element C. The second semiconducting unit SU2 is provided as a second switch S2 having a second transistor T2 with a second anti-parallel diode D2. The second diode D2 is connected in the same way in relation to the energy storage element C as the first diode D1, i.e. conducts current towards the positive end of the energy storage element C. The first semiconducting unit SU1 is furthermore connected to the positive end of the energy storage element C, while the second semiconducting unit SU2 is connected to the negative end of the energy storage element C.

There is also a second group of series-connected semiconducting units SU3 and SU4. This second group of semiconducting units is here connected in parallel with the first group as well as with the energy storage element C. The second group includes a third semiconducting unit SU3 and a fourth semiconducting unit SU4. The third semiconducting unit SU3 is provided as a third switch S3, here provided through a third transistor T3 with anti-parallel third diode D3. However the fourth semiconducting unit SU4 is not a switch. It only comprises one type of semiconducting element, a unidirectional conduction element, a diode D. The fourth semiconducting unit SU4 thus consists of unidirectional conducting elements, where the number of such elements is at least one. This second group of semiconducting units is thus provided in a further branch in parallel with the capacitor C. The fourth semiconductor unit SU4 is furthermore connected to the positive end of the energy storage element C, while the third semiconducting unit SU3 is connected to the negative end of the energy storage element C. Both the diodes D3 and D furthermore have a direction of current conduction towards the positive end of the energy storage element C.

This first type of hybrid full-bridge cell HFBA comprises a first cell connection terminal TEFBA1 and a second cell connection terminal TEFBA2, each providing a connection for the cell to the upper phase arm of the first phase leg of the voltage source converter. In this first type of hybrid full-bridge cell the first cell connection terminal TEFBA1 more particularly provides a connection from the upper phase arm to the junction between the first and the second semiconducting units SU1 and SU2, while the second cell connection terminal TEFBA2 provides a connection between the upper phase arm and a connection point between the third and fourth semiconducting units SU3 and SU4. The junction between the first and second semiconducting units SU1 and SU2 thus provides one cell connection terminal TEFBA1, while the junction between the third and fourth semiconducting units SU3 and SU4 provides a further cell connection terminal TEFBA2. These connection terminals TEFBA1 and TEFBA2 thus provide points where the cell HFBA can be connected to the upper phase arm of the first phase leg. The first cell connection terminal TEFBA1 thereby joins the upper phase arm with the connection point or junction between two of the series-connected switches of the first group, here the first and second switches, while the second cell connection terminal TEFBA2 joins the upper phase arm with a connection point between two of the series connected semiconducting units of the second group, here between the third switch and the sole diode D. The first cell connection terminal TEFBA1 furthermore faces the first pole and thereby couples the cell to the first pole, while the second cell connection terminal TEFBA2 faces the AC terminal of the phase leg and thereby couples the cell to the AC terminal. Thereby the further diode D also couples the second cell connection terminal TEFBA2 to the positive end of the energy storage element.

The expression couple or coupling is intended to indicate that more components, such as more cells and inductors, may be connected between the pole and the cell, while the expression connect or connecting is intended to indicate a direct connection between two components such as two cells. There is thus no component in-between two components that are connected to each other.

Figure 3:
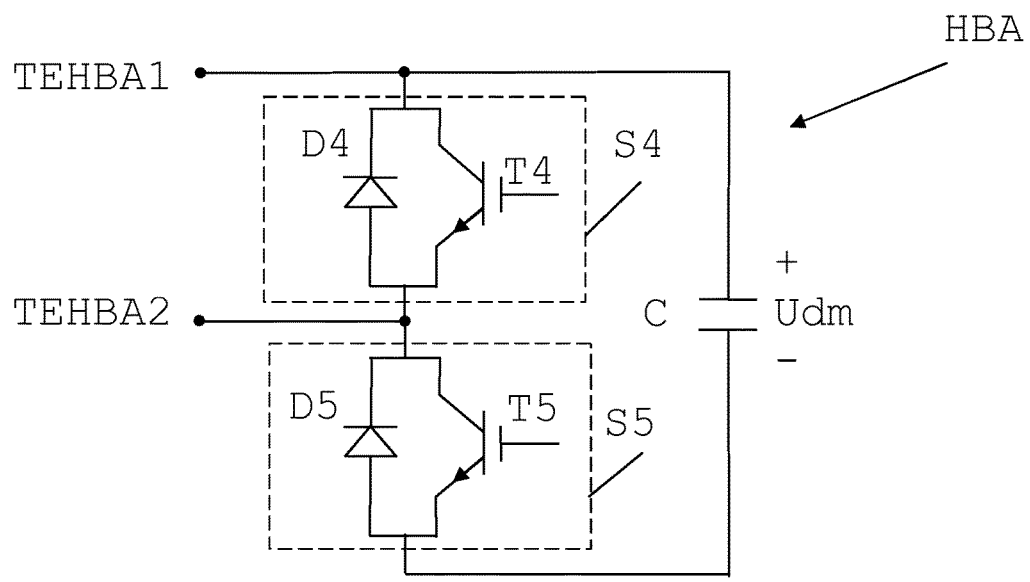

FIG. 3 schematically shows a first type of half-bridge converter cell HBA that may be used in the upper phase arm of the first phase leg. Also this cell includes an energy storage element, here in the form of a capacitor C, which is connected in parallel with a group of switches. Also this energy storage element C provides a voltage Udm, and thus also has a positive and negative end, where the positive end has a higher potential than the negative end. The switches in this group are connected in series with each other. The group here includes a fourth and a fifth switch S4 and S5 (shown as dashed boxes), where each switch S4, S5 may be realized in the form of a switching element that may be an IGBT (Insulated Gate Bipolar Transistor) transistor together with an anti-parallel unidirectional conduction element, which may be a diode. In FIG. 3 there is therefore a fourth switch S4 having a fourth transistor T4 with a fourth anti-parallel diode D4, where the diode D4 has a direction of current conduction towards the positive end of the energy storage element C and a fifth switch S5 connected in series with the fourth switch S4 and having a fifth transistor T5 with anti-parallel diode D5, where the diode D5 has the same direction of current conduction as the fourth diode D4. The fourth switch S4 is connected to the positive end of the energy storage element C, while the fifth switch S5 is connected to the negative end of the energy storage element C.

This first type of half-bridge cell HBA also comprises a first cell connection terminal TEHBA1 and a second cell connection terminal TEHBA2, each providing a connection for the cell to the upper phase arm of the first phase leg of the voltage source converter. In this first type of cell the first cell connection terminal TEHBA1 more particularly provides a connection from the upper phase arm to the junction between the fourth switch S4 and the capacitor C, while the second connection terminal TEHBA2 provides a connection from the upper phase arm to the junction between the fourth and the fifth switches S4 and S5. These cell connection terminals thus provide points where the cell can be connected to the upper phase arm. The second cell connection terminal TEHBA2 thus joins the phase arm with the connection point or junction between two of the series-connected switches of the first group, here the fourth and fifth switches S4 and S5, while the first cell connection terminal TEHBA1 joins the upper phase arm with a connection point between the fourth switch S4 and the positive end of the capacitor C. Also here the first cell connection terminal TEHBA1 faces the first pole, while the second cell connection terminal TEHBA2 faces the AC terminal of the phase leg.

Figure 4:
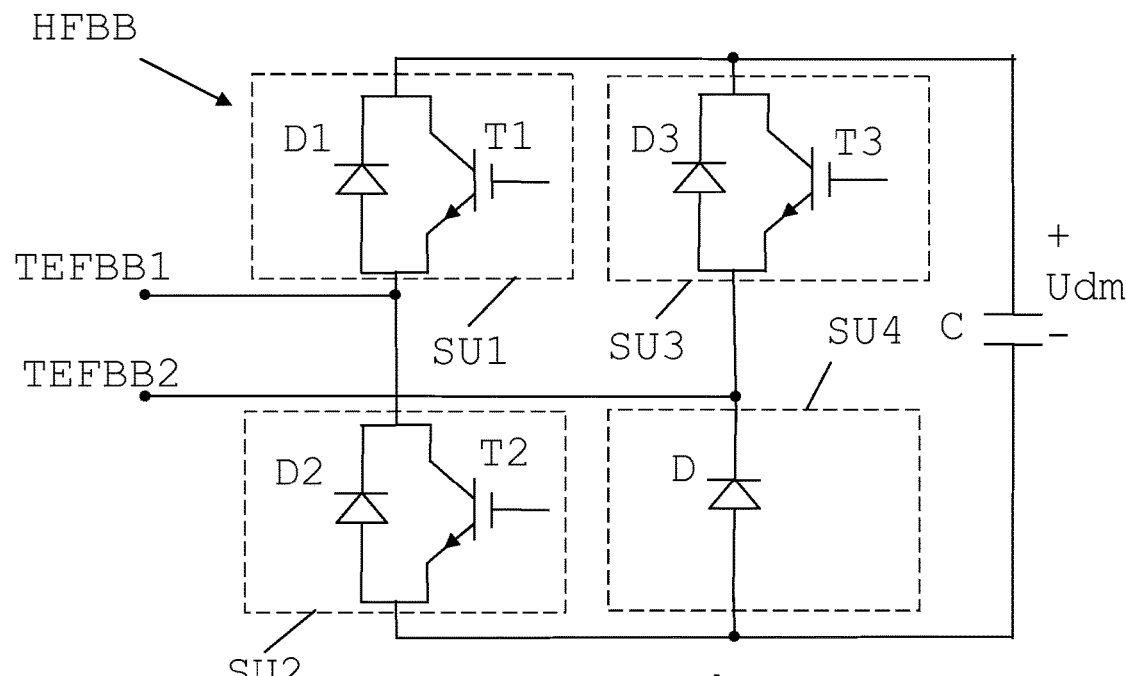

FIG. 4 shows a second type of hybrid full-bridge cell HFBB that may be provided in the second phase arm of the first phase leg.

The cell HFBB is thus a hybrid full-bridge converter cell and also includes an energy storage element, here in the form of a capacitor C, which is connected in parallel with a first group of semiconducting units. Also this energy storage element C provides a voltage Udm, and therefore has a positive and negative end, where the positive end has a higher potential than the negative end. The first group also here includes two series-connected semiconducting units SU1 and SU2 (shown as dashed boxes) in the form of switches S1 and S2. In FIG. 4 there is a first switch S1 having a first transistor T1 with a first anti-parallel diode D1, where the diode D1 has a direction of current conduction towards the positive end of the energy storage element C. There is also a second switch comprising a second transistor T2 with anti-parallel second diode D2 and having the same current conduction as the first diode D1. The first semiconducting unit SU1 is also here connected to the positive end of the energy storage element C, while the second semiconducting unit SU2 is connected to the negative end of the energy storage element C.

There is in this case also a second group of semiconducting units connected in series with each other. This second group of semiconducting units is here connected in parallel with the first group as well as with the energy storage element C. The second group also here includes a third semiconducting unit SU3 and a fourth semiconducting unit SU4, where the third semiconducting unit SU3 is provided through a third switch S3 comprising a third transistor T3 with anti-parallel third diode D3 and the fourth semiconducting unit SU4 is provided using only unidirectional conduction elements, in this example a diode D. The fourth semiconducting unit SU4 thereby consists of a number of unidirectional conducting elements, comprising at least one element. The second group of semiconducting units is thus provided in a further branch in parallel with the capacitor C. The fourth semiconductor unit SU4 is in this case connected to the negative end of the energy storage element C, while the third semiconducting unit SU3 is connected to the positive end of the energy storage element C. The current conducting direction of both diodes D3 and D is towards the positive end of the energy storage element C.

This second type of hybrid full-bridge cell HFBB comprises a first cell connection terminal TEFBB1 and a second cell connection terminal TEFB2, each providing a connection for the cell to the lower phase arm of the voltage source converter, i.e. the lower phase arm of the first phase leg. Just as in the first type of hybrid full-bridge cell, the first cell connection terminal TEFBB1 provides a connection from the lower phase arm to the junction between the first and the second semiconducting units SU1 and SU2, while the second cell connection terminal TEFBB2 provides a connection between the lower phase arm and the connection point between the third and fourth semiconducting units SU3 and SU4. The junction between the first and the second switching units SU1 and SU2 thus provide a cell connection terminal and the junction between the third and fourth semiconducting units SU3 and SU4 provide a further cell connection terminal. In this case the first cell connection terminal TEFBB1 furthermore faces the second pole and thereby couples the cell to the second pole, while the second cell connection terminal TEFBB2 faces the AC terminal of the phase leg. The second cell connection terminals thereby couples the cell to the AC terminal of the phase leg, while the at least one unidirectional conducting element couples the second cell connection terminal to the negative end of energy storage element C.

Figure 5:
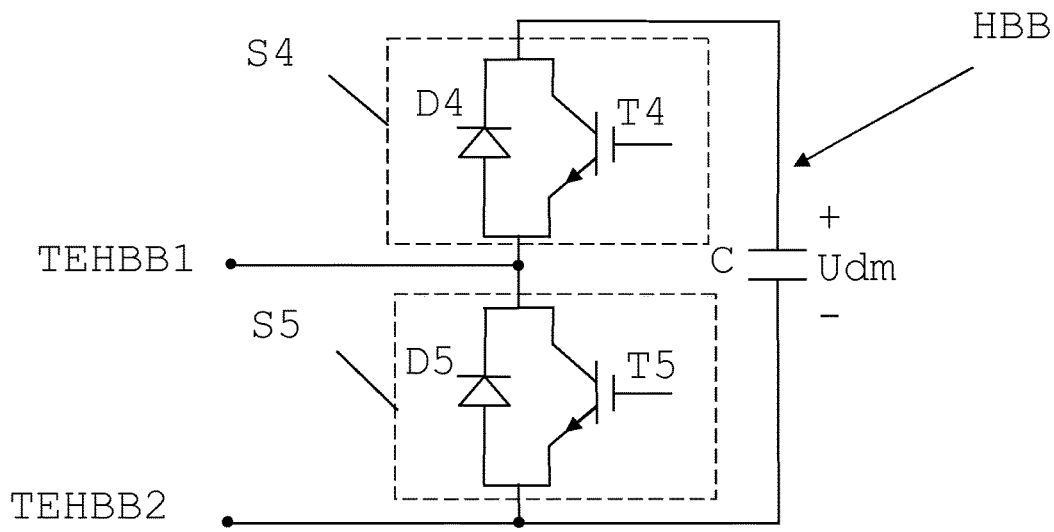

FIG. 5 shows a corresponding second type of half-bridge cell HBB for connection in the lower phase arm of the first phase leg. It comprises a group of switches comprising a fourth and fifth switch S4 and S5 connected in the same way as the fourth and fifth switches of the first type of half-bridge cell. However, in this second type of half-bridge cell the first cell connection terminal TEHBB1 provides a connection from the lower phase arm to the junction between the fourth and the fifth switches S4 and S5, while the second cell connection terminal TEHBB2 provides a connection from the lower phase arm to the junction between the fifth switch S5 and the negative end of the capacitor C. Also in this case the first cell connection terminal TEHBB1 faces the second pole, while the second cell connection terminal TEHBB2 faces the AC terminal of the phase leg.

Figure 6:
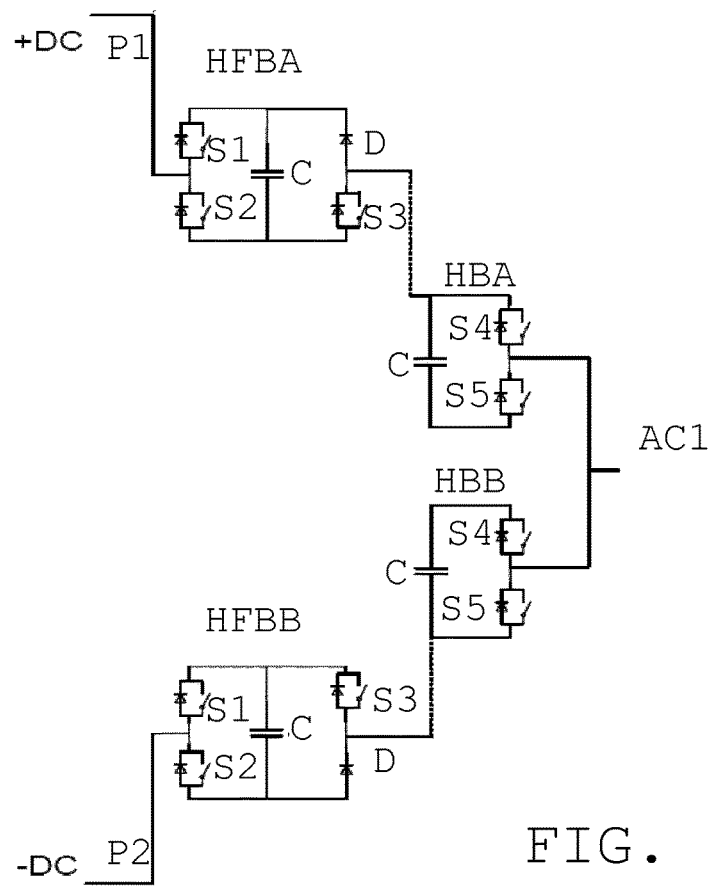

FIG. 6 schematically shows a phase leg where the upper phase arm comprises the first type of hybrid full bridge cells and the first type of half-bridge cells, while the lower phase arm comprises the second type of hybrid full bridge cells and the second type of half-bridge cells connected in the above described way.

The number of hybrid full-bridge cells in the upper phase arm may be between 20 and 100% of all the cells in the upper phase arm, may advantageously be between 20 and 50% and may as an example be 50%, while the rest of the cells in the upper phase arm are half-bridge cells. The same distribution may be provided in the lower phase arm.

In normal operation of the converter cells, the first type of hybrid full-bridge cell and the first type of half-bridge cell of the upper arm of the phase leg shown in FIG. 6 are operated according to the switching table below, table 1. In the table the switching states of the first, second and third switches S1, S2 and S3 of the first type of hybrid full bridge cell are shown together with the switching states of the fourth and fifth switches S4 and S5 of the first type of half-bridge cell. Furthermore, in the table the two cells are considered as a pair together providing a voltage Vout. The table therefore shows the combination of switching states causing a voltage contribution that lowers the first pole voltage +DC. There is thus a voltage contribution −2 Udm that lowers the pole voltage by the voltage across both cells, a voltage contribution −Udm that lowers the pole voltage by the voltage across a single cell and a zero voltage contribution. In the table also the direction of the phase arm current Iarm, i.e. the current through the upper phase arm, is indicated. As can be seen in the table, the switching states are independent of the current direction in the phase arm.

TABLE 1

| S1 | S2 | S3 | S4 | S5 | Vout | Iarm |
|----|----|----|----|----|------|------|
| 1 | 0 | 1 | 0 | 1 | −2Udm | Iarm < 0 |
| 1 | 0 | 1 | 1 | 0 | −Udm | or |
| 0 | 1 | 1 | 0 | 1 | −Udm | Iarm > 0 |
| 0 | 1 | 1 | 1 | 0 | 0 | |

In a similar manner the switching states of the switches of the second type of hybrid full bridge cell and the second type of half-bridge cell of the lower phase arm of the phase leg shown in FIG. 6 are operated according to the switching table below, table 2. In the table the switching states of the first, second and third switches S1, S2 and S3 of the second type of hybrid full-bridge cell are shown together with the switching states of the fourth and fifth switches S4 and S5 of the second type of half-bridge cell. Also here the two cells are considered as a pair together providing a voltage Vout. The table thus shows the combination of switching states causing a voltage contribution that raises the second pole voltage −DC. There is thus a voltage contribution +2 Udm that raises the pole voltage by the voltage across both cells, a voltage contribution +Udm that raises the pole voltage by the voltage across a single cell and a zero voltage contribution. In the table also the direction of the phase arm current Iarm, i.e. the current through the lower phase arm, is indicated. As can be seen also here the switching states are independent of the current direction in the phase arm.

TABLE 2

| S1 | S2 | S3 | S4 | S5 | Vout | Iarm |
|----|----|----|----|----|------|------|
| 1  | 0  | 1  | 0  | 1  | 0    | Iarm < 0 |
| 1  | 0  | 1  | 1  | 0  | +Udm | or |
| 0  | 1  | 1  | 0  | 1  | +Udm | Iarm > 0 |
| 0  | 1  | 1  | 1  | 0  | +2Udm |  |

In the hybrid full-bridge cell, the second branch of semiconducting units, i.e. the branch comprising the third and the fourth semiconducting units, here the branch with the third switch S3 and the diode D, is redundant in normal operation. This can be seen through the third switch S3 always being turned on. This means that the third switch S3 does in normal operation always provide a current path between the AC terminal of the phase leg and the corresponding pole. It can also be seen that therefore there is no needed for any switching element in parallel with the diode D of the fourth semiconducting unit of the full-bridge cells.

The reason for using full-bridge cells is ordinarily not for improving the normal operation, but to be able to limit and sometimes also block fault currents in case of a DC pole fault, such as a pole-to-pole fault or a pole-to-ground fault. When there is a pole-to-ground fault the voltage at the AC terminal of as phase leg can be considered as forming an AC voltage source VAC feeding the phase leg with an AC voltage. When such a fault occurs, the switching elements of all the switches may be opened by the control unit of the converter. The switching element of the third switch S3 may more particularly be open, at least in the negative half period of the AC voltage for the first type of hybrid full-bridge cell HFBA and at least in the positive half period of the AC voltage for the second type of hybrid full-bridge cell HFBB.

Figure 7:
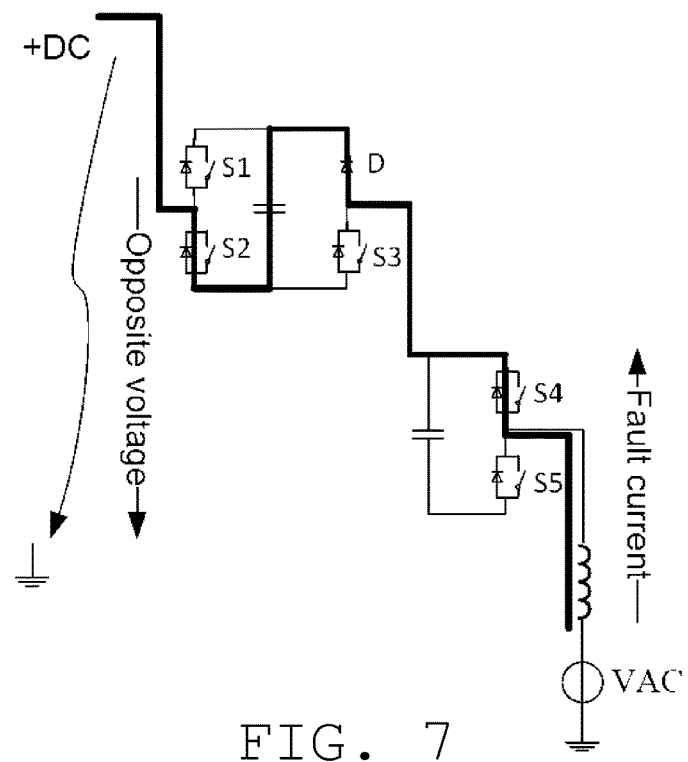
Figure 8:
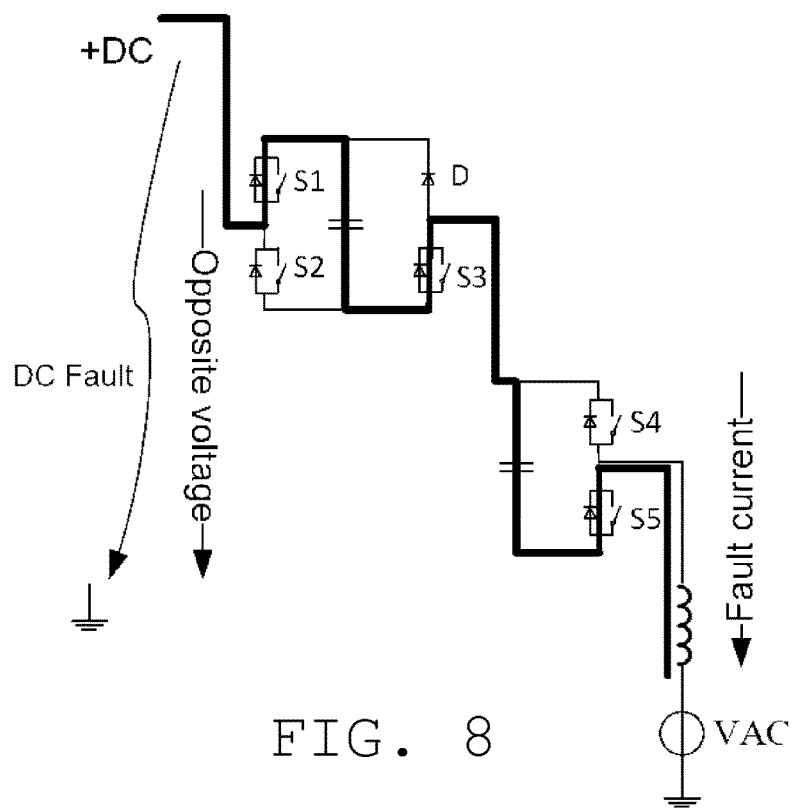

FIG. 7 shows the fault current through the upper phase arm of FIG. 6 in case of a positive pole-to-ground fault at a positive half period of the AC voltage cycle of the AC voltage source VAC and FIG. 8 shows the fault current through the upper phase arm of FIG. 6 in case of a positive pole-to-ground fault at a negative half period of the AC voltage cycle of the AC voltage source VAC.

As can be seen in FIG. 7, the fault current will, in the positive half-period of the AC voltage source VAC, run from the AC voltage source VAC, through the fourth switch S4, through the diode D, through the hybrid cell capacitor and through the diode of the second switch S2 to the first pole. It can also be seen that since the first pole has a positive potential during normal operation, the diode D is together with the second switch S2 connected in a branch between the first and the second cell connection terminals of the hybrid cell that couples the negative end of the hybrid cell energy storage unit to the first pole. It can in this way be seen that the diode D couples an end of the hybrid cell energy storage unit to a pole, which end has a polarity that is opposite to the polarity of the pole in normal operation.

As can be seen in FIG. 8, the fault current will, in the negative half-period of the AC voltage source VAC, flow from the first pole, through the first switch S1, through the hybrid cell capacitor, through the diode of the third switch S3, through the half-bridge cell capacitor and through the diode of the fifth switch S5 to the AC voltage source VAC. It can here be seen that the switching element of the third switch S3 is needed in order for the current to pass through hybrid cell capacitor in the situation depicted in FIG. 7. However, there is no need for a switching element in parallel with the diode D for obtaining the same result in the situation in FIG. 8.

As can be seen there is in both cases, i.e. for both current directions, inserted a cell voltage that limits the fault current. It can also be seen that when the fault current is positive, i.e. runs from the first pole towards the AC terminal, then the voltages of both cells are inserted in the path and thereby limit the fault current. It can also be seen that the diode D functions to couple the energy storage element of the hybrid full bridge cell HFBA between the first and the second cell connection terminals of the hybrid full bridge cell HFBA with a polarity that counteracts negative currents in the phase arm. This means that when the diode D is conducting, the negative end of the hybrid full-bridge cell capacitor faces the first pole P1 and the positive end faces the AC terminal AC1.

A similar situation is at hand if there is a negative pole-to-ground fault.

Figure 9:
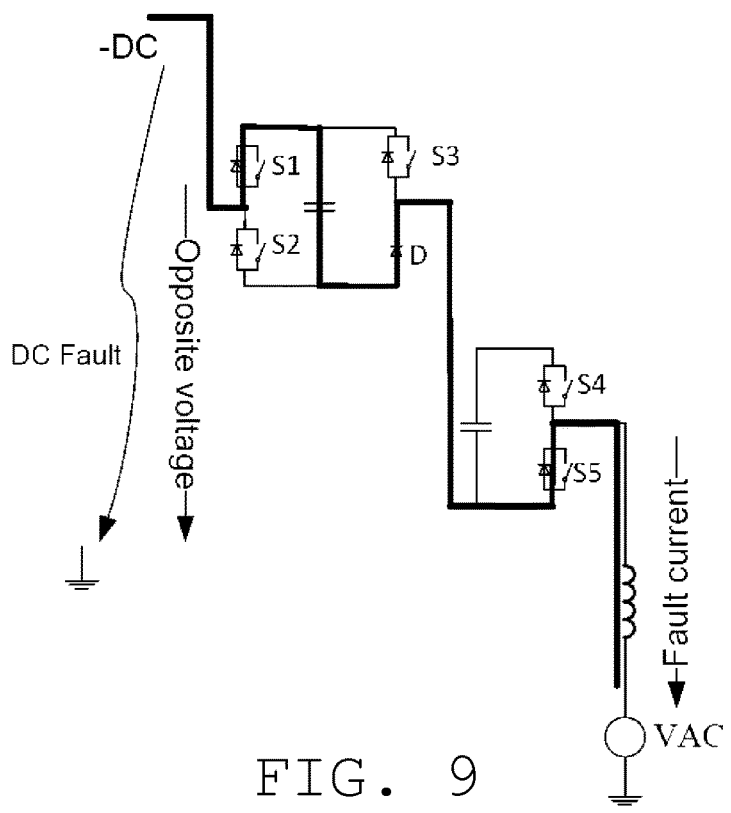
Figure 10:
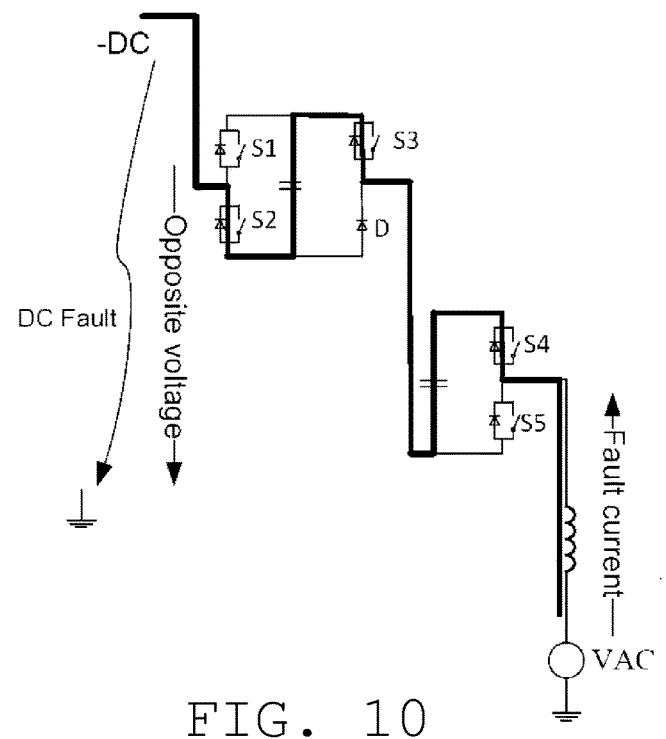

FIG. 9 shows the fault current through the lower phase arm of FIG. 6 in case of a negative pole-to-ground fault at the negative half period of the AC voltage cycle of the AC voltage source VAC and FIG. 10 shows the fault current through the lower phase arm of FIG. 6 in case of a negative pole-to-ground fault at the positive half period of the AC voltage cycle of the AC voltage source VAC.

As can be seen in FIG. 9, the fault current will, in the negative half-period of the voltage source VAC, flow from the second pole, through the diode of the first switch S1, through the hybrid cell capacitor, through the diode D and through the diode of the fifth switch S5 to the AC voltage source VAC. It can also be seen that since the second pole has a negative potential during normal operation, the diode D is together with the first switch S1 provided in a branch between the first and the second cell connection terminals of the hybrid cell that couples the positive end of the hybrid cell energy storage unit to the second pole. It can in this way be seen that the diode D couples an end of the hybrid cell energy storage unit to a pole, which end has a polarity that is opposite to the polarity of the pole in normal operation.

As can be seen in FIG. 10, the fault current will, in the positive half-period of the AC voltage source VAC, run from the AC voltage source VAC, through the fourth switch S4, through the half-bridge cell capacitor, through the diode of the third switch S3, through the hybrid cell capacitor and through the diode of the second switch S2 to the second pole. It can also here be seen that the switching element of the third switch S3 is needed in order for the current to pass through hybrid cell capacitor in the situation depicted in FIG. 9. However, there is no need for a switching element in parallel with the diode D for obtaining the same result in the situation in FIG. 10.

As can be seen there is in both cases inserted a cell voltage that limits the fault current. It can also be seen that when the fault current is positive, i.e. runs from the second pole to the AC source, then the voltages of both cells are inserted in the path and thereby limit the fault current. It can also in this case be seen that the diode D functions to couple the energy storage element of the hybrid full bridge cell HFBB between the first and the second cell connection terminals of the hybrid full bridge cell HFBB with a polarity that counteracts negative currents in the phase arm. This means that when the diode D is conducting the positive end of the hybrid full-bridge cell capacitor faces the second pole P2 and the negative end faces the AC terminal AC1.

If enough such hybrid cells are provided in a phase arm, the fault current because of a pole-to-ground fault of the corresponding pole may be completely blocked.

It can thus be seen that as compared with a conventional topology that mixes half-bridge cells with conventional full-bridge cells, the same fault limiting or fault blocking ability is obtained, however using less components. Furthermore the complexity of the structure is also kept low, which directly affects the cost, loss and modularity of the total converter design.

There is thus provided an alternative mixed cell configuration for DC fault current limitation or DC fault current blocking in cascaded converters used in HVDC, FACTS and other similar applications. The structure thus offers a lower number of components compared to other cell configurations with similar features (DC voltage blocking and fault blocking capability).

This structure operates in the same way as normal cascaded two level half-bridge cells (CTL) while one of the active switches, the third switch, of the hybrid cell is always ON and generate either 2 Udm, Udm, 0 voltage levels, according to different switching states. However, in case of a DC fault, this third switch is turned OFF to provide an opposite voltage polarity according to the fault position in upper or lower arm. This results in the DC fault being blocked or limited.

The cell structure comprises 5 transistor antiparallel diode pairs and only one extra diode which can save one active switch compared to a converter configuration where there is a mix of half-bridge cells and conventional full-bridge cells.

It should be realized that the hybrid cell structures used both in the upper and lower phase arms may be varied.

Figure 11:
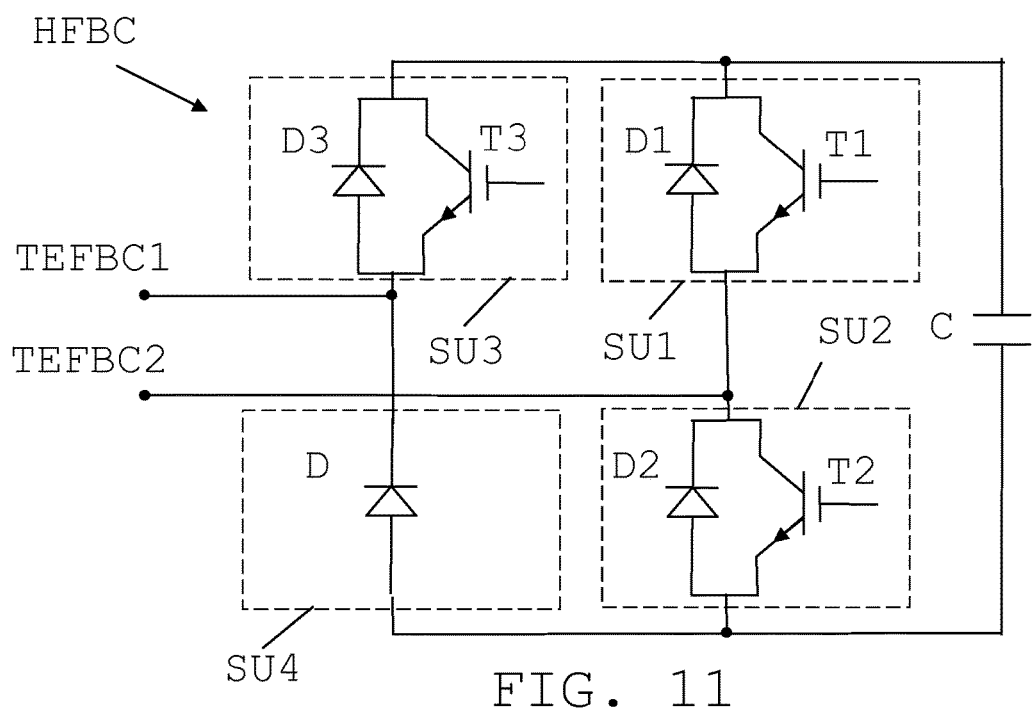

A third type of hybrid cell structure HFBC that may be used in the upper phase arm is schematically shown in FIG. 11. This type differs from the structure of the first type through the fourth semiconducting unit SU4 with the diode D being connected to the negative end of the cell capacitor C and the third semiconducting unit SU3 being connected to the positive end of the cell capacitor C. The first cell connection terminal TEFBC1 is further provided at the junction between the third and fourth semiconducting units SU3 and SU4, while the second cell connection terminal TEFBC2 is provided between the first and second semiconducting units SU1 and SU2. In this type of cell the first cell connection terminal TEFBC1 is a further cell connection terminal coupling the cell HFBC to the first pole and the at least one unidirectional conducting element couples the first cell connection terminal TEFBC1 to the negative end of the energy storage element C.

Figure 12:
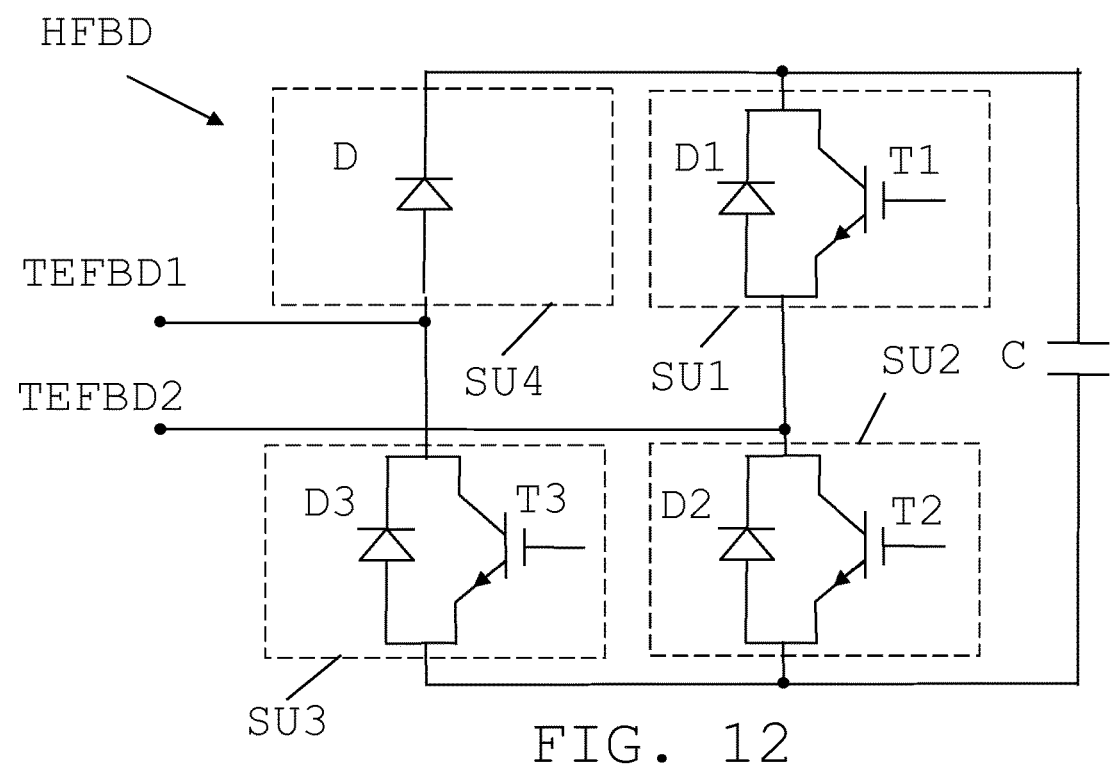

A fourth type of hybrid cell structure HFBD that may be used in the lower phase arm is schematically shown in FIG. 12. This differs from the structure of the second type through the fourth semiconducting unit SU4 with the diode D being connected to the positive end of the cell capacitor C and the third semiconducting unit SU3 being connected to the negative end of the cell capacitor C. The first cell connection terminal TEFBD1 is further provided at the junction between the third and fourth semiconducting units SU3 and SU4, while the second cell connection terminal TEFBD2 is provided between the first and second semiconducting units SU1 and SU2. In this type of cell the first cell connection terminal TEFBD1, which is here a further cell connection terminal, couples the cell to the second pole and the at least one unidirectional conducting element D couples the first cell connection terminal TEFBD1 to the positive end of the energy storage element C.

The third type of hybrid cell may replace the first type in the upper arm. The third type may also be combined with the first type. There may thus be cells of both the first and the third type of hybrid cell in the upper phase arm.

In a similar manner, the fourth type of hybrid cell may replace the second type in the lower arm. It may also be combined with the second type. There may thus be cells of both the second and the fourth type of hybrid cells in the lower phase arm.

There are a number of further variations that are possible apart form those already mentioned. It is possible that only one of the phase arms comprises hybrid full-bride cells. This may be of interest if pole-to-ground faults of one of the poles are extremely rare. This may be the case if one of the poles is an overhead line while the other is provided through a cable. All cells of a phase arm may also be hybrid cells.

The distribution between the hybrid full-bridge cells and the half-bridge cells may furthermore vary. The percentage of hybrid-full bridge cells in a phase arm may for instance vary between 20 and 100%. As an alternative it may vary between 20 and 50%. 50% is normally the percentage required for full fault current blocking ability. A higher percentage may be wanted if redundancy is an issue, while a lower may be used if only fault current limitation is desired. The other cells, i.e. the cells that are not hybrid full-bridge cells, are furthermore not necessarily half-bridge cells. They can also be full-bridge cells or clamped double-cells. It is furthermore possible with a different distribution of hybrid full-bridge cells in the two phase arms. The hybrid full-bridge cells may furthermore be provided in other types of converters than the ones shown, such is in converters that employ full bridge-cells combined with director switches, which director switches operate at a fundamental frequency for selectively connecting an AC terminal to a waveform produced by cells in a phase arm.

The invention also provides the following further advantages:
  It provides a fault tolerant cell structure that can be used for any kind of cascaded converter.
  It lowers the number of components compared to existing cell structures used for DC fault blocking
  On the basis of required voltage rating, the same number of devices is provided in the conduction path as when there is a mix of half-bridge and conventional full-bridge cells
  The number of gate drive circuits required are reduced compared to when there is a mix of half-bridge cells and conventional full-bridge cells
  It provides a modular and easily implemented cell design structure
  It allows the possibility to form a mixture of connections of hybrid full-bridge cells and half-bridge cells and series-connection of hybrid full-bridge cells
  It provides a DC fault voltage blocking capability
  It provides a cost effective structure
  It provides a compact structure
  It provides the possibility to reduce the cost for cascaded topologies
  It provides the possibility to reduce the loss of cascaded topologies From the foregoing discussion it is evident that the present invention can be varied in a multitude of ways. It shall consequently be realized that the present invention is only to be limited by the following claims.

The invention claimed is:

1. A multilevel voltage source converter configured to convert between alternating current and direct current, comprising:
a plurality of phase legs connected between two DC poles, each phase leg comprising an upper phase arm and a lower phase arm, at least one of the upper phase arm and the lower phase arm comprising a number of cells between one of the two DC poles and an AC terminal, said cells comprising at least one hybrid full bridge cell for fault current handling operation, wherein each cell in the at last one of the upper phase arm and the lower phase arm is controllable to contribute to meeting a reference voltage for obtaining a waveform on the AC terminal of the phase leg, said hybrid full-bridge cell consisting of:
a first cell connection terminal for coupling to the one of the two DC poles;
a second cell connection terminal for coupling to the AC terminal; and
an energy storage element having a positive and a negative end;
a first group of series connected semiconducting units, wherein the first group of series connected semiconducting units is connected in parallel with the energy storage element, wherein the semiconducting units of the first group of series connected semiconducting units comprises first and second semiconducting units, wherein the first semiconducting unit only comprises a first active switching element with a first anti-parallel connected unidirectional conducting element, wherein the second semiconducting unit only comprises a second active switching element with a second anti-parallel connected unidirectional conducting element, wherein the first semiconducting unit and the second semiconducting unit are connected in series, and wherein a junction between the first semiconducting unit and the second semiconducting unit forms one of the first cell connection terminal and the second cell connection terminal; and
a second group of series connected semiconducting units, wherein the second group of series connected semiconducting units is connected in parallel with the energy storage element as well as with the first group of series connected semiconducting units, wherein the semiconducting units of the second group of series connected semiconducting units comprises third and fourth semiconducting units, wherein the third semiconducting unit only comprises a third active switching element with a third anti-parallel connected unidirectional conducting element, wherein the fourth semiconducting unit only comprises a fourth unidirectional conducting element, wherein the third semiconducting unit and the fourth semiconducting units are connected in series, wherein a junction between the third semiconducting unit and the fourth semiconducting unit forms the other one of the first cell connection terminal and the second cell connection terminal, and wherein the third active switching element of the third semiconducting unit in the second group of series connected semiconducting units is configured to always be in on state in normal operation of the converter.

2. The multilevel voltage source converter according to claim 1, wherein the first, second and third active switching elements of the hybrid full-bridge cell are configured to be turned off if a fault current due to a DC pole fault runs through the phase arm.

3. The multilevel voltage source converter according to claim 2, wherein a respective direction of conduction of the first, second, third and fourth unidirectional conducting elements of the hybrid full-bridge cell is toward the positive end of the energy storage element.

4. The multilevel voltage source converter according to claim 2, wherein the fourth semiconducting unit is connected such that the fourth unidirectional conducting element of the fourth semiconducting unit couples the energy storage element between the first cell connection terminal and the second cell connection terminal such that when the fourth unidirectional conducting element of the fourth semiconducting unit is conducting, an end of the energy storage element facing the one of the two DC poles has a polarity opposite to a polarity of the one of the two DC poles.

5. The multilevel voltage source converter according to claim 2, wherein one hybrid full-bridge cell is provided in a positive phase arm between one of the two DC poles and the AC terminal.

6. The multilevel voltage source converter according to claim 1, wherein a respective direction of conduction of the first, second, third and fourth unidirectional conducting elements of the hybrid full-bridge cell is toward the positive end of the energy storage element.

7. The multilevel voltage source converter according to claim 6, wherein the fourth semiconducting unit is connected such that the fourth unidirectional conducting element of the fourth semiconducting unit couples the energy storage element between the first cell connection terminal and the second cell connection terminal such that when the fourth unidirectional conducting element of the fourth semiconducting unit is conducting, an end of the energy storage element facing the one of the two DC poles has a polarity opposite to a polarity of the one of the two DC poles.

8. The multilevel voltage source converter according to claim 6, wherein one hybrid full-bridge cell is provided in a positive phase arm between one of the two DC poles and the AC terminal.

9. The multilevel voltage source converter according to claim 1, wherein the fourth semiconducting unit is connected such that the fourth unidirectional conducting element of the fourth semiconducting unit couples the energy storage element between the first cell connection terminal and the second cell connection terminal such that when the fourth unidirectional conducting element of the fourth semiconducting unit is conducting, an end of the energy storage element facing the one of the two DC poles has a polarity opposite to a polarity of the one of the two DC poles.

10. The multilevel voltage source converter according to claim 9, wherein one hybrid full-bridge cell is provided in a positive phase arm between one of the two DC poles and the AC terminal.

11. The multilevel voltage source converter according to claim 1, wherein one hybrid full-bridge cell is provided in a positive phase arm between one of the two DC poles and the AC terminal.

12. The multilevel voltage source converter according to claim 11, wherein the other one of the first cell connection terminal and the second cell connection terminal is the first cell connection terminal coupling the hybrid full-bridge cell to the first pole and the fourth unidirectional conducting element couples the first connection terminal to the negative end of the energy storage element.

13. The multilevel voltage source converter according to claim 11, wherein the other one of the first cell connection terminal and the second cell connection terminal is the second cell connection terminal coupling the hybrid full-bridge cell to the AC terminal and the fourth unidirectional conducting element couples the second cell connection terminal to the positive end of the energy storage element.

14. The multilevel voltage source converter according to claim 1, wherein one hybrid full-bridge cell is provided in a negative phase arm between one of the two DC poles and the AC terminal.

15. The multilevel voltage source converter according to claim 14, wherein, in the hybrid-full bridge cell in the negative phase arm, the other one of the first cell connection terminal and the second cell connection terminal is the first cell connection terminal coupling the hybrid full-bridge cell to the second pole and the fourth unidirectional conducting element couples the first cell connection terminal to the positive end of the energy storage element.

16. The multilevel voltage source converter according to claim 14, wherein, in the hybrid-full bridge cell in the negative phase arm, the other one of the first cell connection terminal and the second cell connection terminal is the second cell connection terminal coupling the hybrid full-bridge cell to the AC terminal of the phase leg and the fourth unidirectional conducting element couples the second cell connection terminal to the negative end of the energy storage element.

17. The multilevel voltage source converter according to claim 1, wherein the percentage of hybrid full-bridge cells in the at least one of the upper phase arm and lower phase arm is in the range of 20-100%.

18. The multilevel voltage source converter according to claim 17, wherein the percentage of hybrid full-bridge cells in the at least one of the upper phase arm and lower phase arm is 50%.

19. The multilevel voltage source converter according to claim 1, wherein the at least one of the upper phase arm and lower phase arm comprises at least one half-bridge converter cell.

* * * * *